United States Patent Office 3,104,313
Patented Sept. 17, 1963

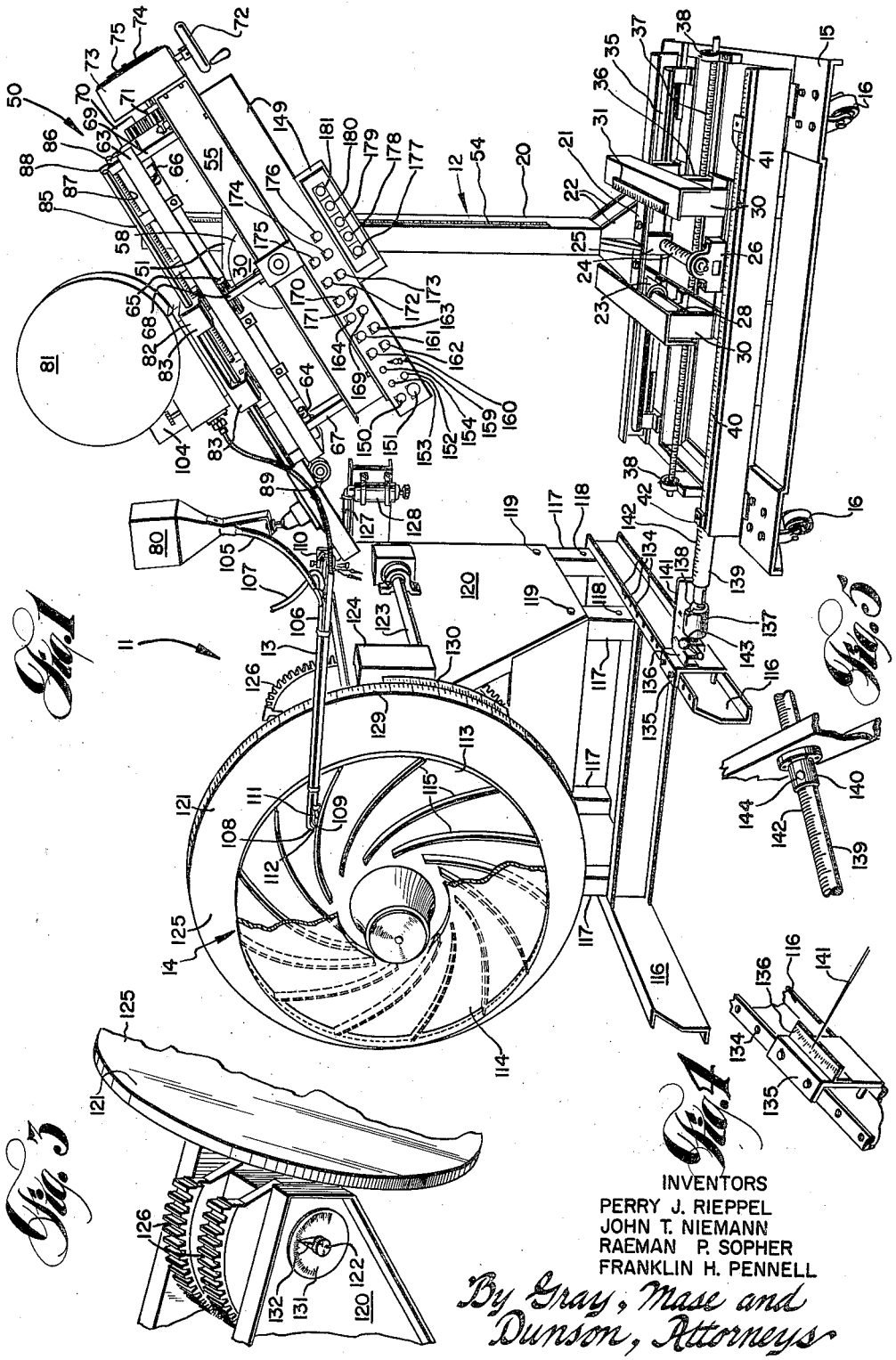

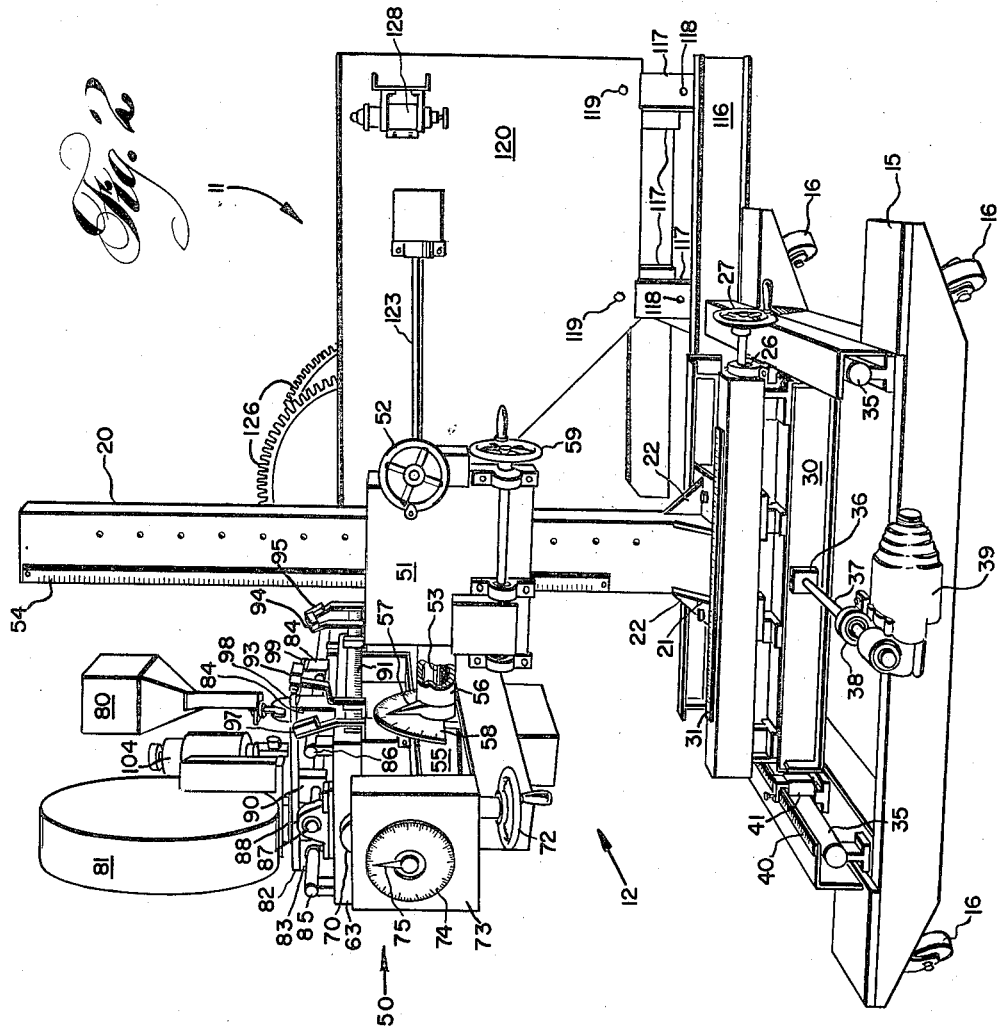

3,104,313
METHOD AND APPARATUS FOR SEMI-AUTOMATIC WELDING
Perry J. Rieppel, Worthington, and John T. Niemann, Columbus, Ohio, Raeman P. Sopher, Gales Ferry, Conn., and Franklin H. Pennell, Ivyland, Pa., assignors, by direct and mesne assignments, to De Laval Turbine Inc., Trenton, N.J., a corporation of Delaware
Filed May 9, 1960, Ser. No. 27,692
8 Claims. (Cl. 219—124)

This invention relates to a method and apparatus for semiautomatic welding, especially suitable for welding in the manufacture of welded impellers for centrifugal-type compressors and the like.

For convenience, the following description is directed toward impellers. While the present invention is especially adaptable to the fabrication of centrifugal compressor impellers by welding, it is not limited thereto. These impellers consist of a hub plate and side plate separated by vanes which may be either straight or curved. The fluid being pumped enters in the central area of the side plate, moves through the passages between the vanes and the side plate and exits around the periphery of the wheel. The impeller may be driven by different types of prime movers, and is connected to the shaft of the power source through the hub plate.

Until recently, impellers were assembled by riveting. In the riveted assemblies, the vanes were either machined as an integral part of the side plate or were separate units, depending upon whether the opening between the side plate and hub plate was narrow or wide. This opening determined the amount of metal that had to be removed by machining. However, in recent years horsepower requirements have increased to the point where riveted joints are not satisfactory. Several riveted impellers have failed in service. Welding is considered an improved means of fabrication.

In prior procedures for automatic welding along a complex track, it was the practice to either use a fixed gun-carriage position with an immobile welding tip and to gain the movement necessary for welding by movement of a welding positioner alone, or the piece to be welded was held stationary and movement imparted to the welding gun. However, according to the present invention, a much wider range of possible automatic movements may be obtained and shapes heretofore impossible to weld may be expeditiously and efficiently automatically welded by moving both the welding positioner and the welding gun simultaneously in a controllable manner.

According to the present invention, there is provided an automatic welding method in which both a welding gun and a welded-piece positioner are simultaneously, accurately, and controllably moved. That is, in an automatic welding method, wherein the work to be welded is mounted on a positioner, there is provided the step of simultaneously, accurately, and controllably moving both the positioner and a welding gun during the welding of the work.

Also, the present invention provides apparatus for automatically welding a workpiece, the apparatus consisting of a positioner adapted to receive the workpiece and hold it firmly during the welding operation, a welding gun and related equipment adapted for the welding of a workpiece, and mechanical means for simultaneously, accurately, and controllably moving both the positioner and the welding gun.

There are many configurations of workpieces upon which welding operations are impossible to perform because of the inability of a welding operator to reach into the confined spaces where the welding is to be performed. Conventional equipment is too bulky or cannot be accurately controlled. This is especially true where attempts have been made to weld impeller blades confined between the side plate and hub plate of an impeller. This invention provides a method and apparatus for performing such welding operations.

One advantage of this invention is that it reduces the cost of fabricating impellers.

Another advantage of the invention is the efficient provision of a method for welding impellers.

Another advantage of the present invention is that locations heretofore impossible to reach with conventional welding apparatus can now be reached and welded.

Yet, another advantage of the invention is that it provides improved apparatus suitable and especially useful for welding impellers.

In the drawings:
FIG. 1 is a perspective of the automatic welding apparatus of this invention;
FIG. 2 is another perspective view of the automatic welding apparatus of this invention;
FIG. 3 is a perspective view of a portion of the automatic welding apparatus shown in FIGS. 1 and 2; and
FIGS. 4 and 5 are enlarged perspective views of portions of the automatic welding apparatus shown in FIGS. 1 and 2.

Referring to FIGS. 1 and 2 a typical automatic welding apparatus of the present invention comprises two major sections, a welding positioner 11 and a welding head 12. The welding head 12 imparts a number of movements to the welding gun 13 in order to trace a welding pattern of a workpiece such as the impeller 14 shown in FIG. 1. The welding head 12 is mounted on a base frame 15 which, in turn is mounted on casters 16—16 to allow movement of the welding head 12 in a horizontal plane by means of adjusting mechanisms which are explained subsequently.

A main column 20 is fixedly attached to a base plate 21 and may be provided with additional members to support it in a perpendicular position such as gussets 22—22. The base plate 21 is supported on sleeves 23—23 and threadedly engaged with a threaded shaft 24 by means of a block 25 fixedly attached to the base plate 21. The threaded shaft 24 is rotatably supported at each end by pillow blocks 26—26 and has a hand wheel 27 at one end. Rotation of the hand wheel 27 causes the sleeves 23—23 to slide upon cylindrical bars 28—28 supported by frame 30, providing one horizontal movement of the main column 20. A scale 31 is provided parallel to the cylindrical bars 28—28 so that the horizontal travel of the main column 20 can be measured.

The frame 30 that supports the cylindrical bars 28—28 is slidably mounted by a suitable means to a second set of cylindrical bars 35—35 perpendicular to the first cylindrical bars 28—28. Frame 30 is also threadedly engaged by suitable means such as block 36 to a threaded shaft 37 rotatably mounted on the base frame 15 by a suitable means such as pillow blocks 38—38. The threaded shaft 37 is rotated by means of a variable-speed motor 39 mounted by suitable means to the base frame 15. Rotation of threaded shaft 37 causes a second horizontal movement of the main column 20 perpendicular to the first movement caused by rotating threaded shaft 24. A scale 40 is provided parallel to the cylindrical bars 28—28 so that the horizontal travel of the second movement of the main column 20 may be measured. Limit switches 41 and 42 are mounted on the base frame 15 and are adjustable along the scale 40. In some cases the main column 20 is moved by the variable-speed motor 39 during welding. The limit switches 41 and 42 are in series with the circuit of the variable-speed motor 39 so that when the frame 30 strikes the limit switch 41 or 42, the variable-speed motor 39 is shut off and the horizontal movement of the main column 20 is stopped.

The major portion of the welding apparatus or gun carriage 50 is slidably mounted on the main column 20. Naturally, the horizontal movement of the main column 20, described above, imparts identical movement to the gun carriage assembly 50.

The gun carriage 50 is supported by a gear box 51 slidably mounted on the main column 20. The gear box 51 engages a linear gear (not shown) attached to the main column 20. Rotation of the hand wheel 52 on the gear box 51 depresses or elevates the gear box 51 and consequently the gun carriage by virtue of its attachment through the shaft 53. A scale 54 is provided on the main column 20 so that the height of the gun carriage 50 may be determined.

The gun carriage 50 is supported from the gear box 51 by horizontal shaft 53 attached to the base frame 55 of the gun carriage 50 and is covered by a sleeve 56. Sleeve 56 which is fixedly attached to the gear box 51 has a pointer 57 adjacent to a protractor 58, the protractor being fixedly attached to the base frame 55 of the gun carriage 50. Cranking of the hand wheel 59 on the gear box rotates the shaft 53 and consequently tilts the gun carriage 50. The angle of any such tilt is indicated by the pointer 57 and protractor 58.

The upper frame 63 of the gun carriage 50 is fixedly attached to journals 64, 65, and 66 which are rotatably supported by journal boxes 67, 68, and 69 attached to the base frame 55 of the gun carriage 50. Journal 66 is attached to a half gear 70 that engages gear 71 activated by a hand crank 72 on gear box 73. Rotation of hand crank 72 rotates the upper frame 63, as much as 45 degrees clockwise or counterclockwise about an axis passing through journals 64, 65, and 66. A protractor 74 and pointer 75 are provided on the gear box 73 to indicate the angle to which the upper frame 63 is rotated.

Welding gun 13, flux hopper 80, and filler-wire feeder 81 are attached by suitable means to mounting plate 82 which is free to move back and forth parallel to an axis passing through the journals 64, 65, and 66 on slides 83—83 and 84—84 which are slidably mounted on bars 85 and 86. Threaded shaft 87 rotatably mounted on pillow blocks 88 and rotated by variable-speed motor 89 is threadedly engaged with mounting plate 82 through block 90. Rotation of the threaded shaft 87 imparts the above-described back-and-forth movement to the mounting plate 82. A scale 91 is provided on the upper frame 63 parallel to an axis passing through journals 64, 65, and 66 to insure proper placement of limit switches 92, 93, 94 and 95. Limit switches 92 and 95 are in series with the circuit of the variable-speed motor 89 and consequently control the extremities of travel of the mounting plate 82. Limit switches 92 and 95 are activated by contact with slides 84—84 supporting the mounting plate 82. Limit switches 93 and 94 are activated by cams 98 and 99, respectively. Cams 98 and 99 are attached to the mounting plate 82. The function of limit switches 93 and 94 is explained subsequently.

The wire feeder 81 supplies the weld metal to the welding gun 13 and is activated by a variable-speed motor 104, the feed rate, of course, being compatible with the welding speed. A welding flux passes from the flux hopper 80 to a conduit 105 into a tube 106 of the welding gun 13. The flux is picked up and carried through the tube 106 by the shielding gas supplied through a conduit 107 also attached to the tube 106 of the welding gun 13. The gas and flux are discharged at the tip 108 of welding gun 13 at a point adjacent to the welding electrode 109. The provision for carrying the flux with the shielding gas provides for a much smoother weld and prevents "spatter" and "arc blow." Shielding gas alone is not sufficient to shield the weld area 112 since the weld would oxidize severely during cooling, but the shielding gas is not only an extremely convenient method of introducing the flux but serves to provide a more instantaneous shield during the short period required for the flux to melt and become effective.

The welding gun 13 is pivotally mounted in bearing 110 attached to the gun carriage 50. The welding gun 13 pivots in a plane perpendicular to the mounting plate 82. At the tip of the welding gun 13 near the electrode 109 is a rest 111 that rides on the workpiece or impeller 14.

The welding positioner 11 may be adjusted and controlled to raise, lower, tilt, and rotate the workpiece or impeller 14. The impeller 14 has a hub plate 113, side plate 114 and a number of vanes 115—115.

The welding positioner 11 is provided with a base frame 116 having vertical posts 117—117. The vertical posts are provided with a number of holes 118—118 at various heights so that the height of the positioner 11 may be adjustable by inserting bolts 119—119 through the side plates 120—120 at a selected height. The positioner table 121 is geared into a horizontal positioner axle 122 between the side plates 120—120. One end of the positioner axle is geared to shaft 123 through gear box 124. Rotation of shaft 123 in either direction rotates the table 121 about an axis perpendicular to its face 125. Half gears 126—126 are attached to the positioner axle and engaged by suitable gears to power means (not shown) within the positioner 11 to provide rotation to the table 121 about the positioner axle.

Shaft 123 is rotated by a variable-speed motor within the positioner housing. The speed of the variable-speed motor (not shown) is controlled by rotating shaft 127. Shaft 127 is rotated by electric speed-control motor 128 so that speed of the rotation of table 121 may be altered during welding.

The angular rotation of the table 121 in either direction about an axis perpendicular to its face 125 and through the center of the face 125 is indicated by the relationship of a protractor scale 129 on the outer rim of the table 121 to a vernier 130 attached to the positioner side plates 120. Tilting of the table 121 about the horizontal axle is indicated by a protractor 131 and a pointer 132 (shown in FIG. 3) attached to the end of the positioner axle on the side of the welding positioner 11 opposite the gear box 124.

Horizontal adjustment between the welding positioner 11 and the welding head 12 is provided for between the base frame 15 of the welding head 12 and base frame 116 of the welding positioner 11. The base frame 116 of welding positioner 11 has a number of holes 134—134 so that bracket 135 may be bolted to the base frame 116 at various positions. Attached to the bracket 135 are a protractor 136 and socket 137. The socket 137 receives the ball end 138 of a bar 139 which passes through a sleeve 140, said sleeve being attached to the base frame 15 of the welding head 12. A pointer 141 (shown in FIGS. 1 and 4) is attached to the bar 139 so that when the base frame 15 is moved about the ball 138 in the socket 137, the angle of movement is indicated by the pointer 141 on the protractor 136.

The welding positioner 11 and welding head 12 may be moved closer or farther apart by sliding the bar 139 along the sleeve 140. A scale 142 (shown in FIGS. 1 and 5) is provided on the bar 139 to measure the distance between the welding positioner 11 and welding head 12. The socket 137 is provided with a tightening handle 143 and the sleeve 140 is provided with a set screw 144 to lock their components in position once a setting between the welding positioner 11 and the welding head 12 has been made.

A control panel 149 is attached to the base frame 55 of the gun carriage 50. The first button on the control panel 149 is the "start" button 150. The "stop" button 151 is located below the "start" button 150. A selector switch or "weld-track" switch 152, located next to the stop button 151 determines whether the machine tracks or welds. The position of the weld-track switch 152 is indicated by two lights 153 and 154 above the switch 152. A green light 154 is for the track setting and a red light 153 shows that the selector switch 152 is in the weld position. When the switch 152 is in the track position, the machine will go through its complete cycle without welding. This setting is used during the setup. Throwing the switch 152 to the weld position connects the power source and starts the flow of shielding gas to the welding gun 13.

A cycle selector switch 159 is located next to the weld-track switch 152. The position of the cycle selector switch 159 determines the sequence of events that occur during welding. The position of the switch 159 is indicated by the lights 160, 161, 162, and 163 located next to the switch. When the switch 159 is in the "cycle No. 1" position, indicated by the light 160, the positioner table 121 and the gun carriage 50 move. Thus, the variable-speed motor inside the welding positioner 11 that moves the positioner table 121 is activated and the variable-speed motor 89 that moves the mounting plate 82 of the gun carriage 50 is activated. This cycle is used for welding impeller vane contours which consist of a single radius.

When the switch 159 is in the "cycle No. 2" position, indicated by the light 161, the same sequence of events occurs as that of cycle No. 1, except that the limit switch 94 is in the circuit. Limit switch 94 is used to start and stop the positioner speed-control motor 127. As previously stated, the switch 94 is engaged and activated by cam 99 attached to the mounting plate 82. The length of time that the speed-control motor 128 operates is determined by the length of the cam 99 and speed of the mounting plate 82. Activation of the speed-control motor 128 allows the speed of the positioner table 121 to be changed during welding. This cycle is used in welding impeller vane contours which consist of two different radii.

With the switch 159 in the "cycle No. 3" position, indicated by the light 162, variable-speed motor 39 is in the circuit and only the base portion of the welding head 12 that is mounted on cylindrical bars 28—28 moves and moves in a direction parallel to bars 28—28. Cycle No. 3 is used to weld impellers with straight vanes.

"Cycle No. 4," indicated by light 163, is set by setting the selector switch 159 to "cycle No. 3" and pressing "cycle No. 4" reset button 164. When the start button 150 is pressed, the positioner table 121 and the gun carriage 50 move as in cycle No. 1; however, in this case limit switch 93 is in the circuit. The mounting plate 82 moves as in cycle No. 1 until the cam 98 engages limit switch 93. When limit switch 93 is engaged by cam 98, the positioner table 121 and mounting plate 82 stop and the base plate of the welding head 12 moves as in cycle No. 3. Cycle No. 4 is used to weld impeller vane contours which consist of a single radius and a straight section.

The next switch 169 determines the direction of movement of the mounting plate 82. During welding of impellers, the usual direction of mounting plate 82 movement is out or away from the impeller 14, but the apparatus may be arranged so that the mounting plate 82 moves toward the positioner table 121.

Switch 170 determines the direction of rotation of the positioner table 121. In welding impeller vanes the table 121 is rotated in one direction while welding on the convex side of the impeller vane and is rotated in the opposite direction while welding on the concave side of the impeller vane.

Switch 171 determines the direction of rotation of the speed-control motor 128. Depending upon the position of switch 171, the positioner table 121 speed is increased or decreased during welding.

Switch 172 determines the direction of movement of the base portion of the welding head 12. The base portion thus may be moved in or out during welding.

Buttons 173 and 174 are "jog" buttons used for slight positioning of the welding gun 13 during setup procedure or on other necessary occasions. Jog button 173 moves the base portion of the welding head 12 and jog button 174 is used to adjust the mounting plate 82.

Button 175 is a "gas purge" button and is used to start the flow of flux to the tip 108 of the welding gun 13 prior to welding.

Wire jog button 176 may be used to aid in threading the welding wire through the wire feeder 81 and insuring that wire is available at the electrode 109 of the welding gun 13 before a welding cycle is started.

Buttons 177, 178, 179, 180, and 181 control the welding positioner 11 during nonautomatic welding operations. Activation of button 177 tilts the positioner table 121 about the positioner axle 122 in one direction and button 178 tilts the positioner table 121 in the opposite direction. Buttons 180 and 181 rotate the positioner table 121 about an axis perpendicular to and passing through the center of its face 125 and button 179 stops the positioner table 121 from rotating after activation of buttons 180 or 181.

In the setup procedure, a suitable welding speed should be selected commensurate with the material to be welded. This may be done by welding test plates having the same thickness and joint contours of the actual workpiece. The amount of penetration and bead contour will be a function of travel speed, welding current, wire feed and arc voltage.

When the welding conditions have been determined, a layout of the workpiece should be prepared showing the path to be followed by points on the workpiece as it is rotated. The layout should be made so that the point where welding begins is in the flat welding position. When the path of motion has been determined, the end points are connected by a straight line. This line represents the angle of the gun carriage as measured by the pointer 57 and protractor 58 and also gives the distance that the gun carriage 50 must move. The other factors, such as the speed of the welding positioner 11 and speed of the movement of the welding head 12, can then be determined. Also, the layout will show the points at which a speed change, when required, should begin and end. The values determined from this layout are then used to set up the welding head 12.

Once the information from the layout has been obtained, the workpiece such as the impeller 14 is set up on the positioner table 121. This is done with the table 121 in the flat position with the protratcor 129 and vernier 130 at zero position. The workpiece 14 is then fastened on the positioner table 121 and tilted to welding position by pressing button 180 and 181 whichever is necessary. The welding head 12 is then adjusted so that the welding gun 13 will be horizontal or nearly horizontal when in position to begin welding. The welding head 12 should be manually adjusted so as to provide it with maximum automatic travel during welding. The various limit switches 41, 42, 92, 93, 94, and 95 are positioned and clamped in place. The settings are then checked with the weld-track switch 152 in "track" position so that the green light 154 is illuminated. During the course of tracking and consequent welding, the welding gun 13 should remain in the horizontal position. It may be necessary to change some of the machine settings to accomplish this. When the desired settings are obtained, and if the workpiece is to be welded in a number of places, the position of the workpiece may be changed and the same procedure followed to set up the other welds.

After setup is complete the workpiece is assembled and tack-welded in place.

If the machine settings used in welding a given workpiece are recorded, the machine can readily be set up at a later date for welding additional workpieces of the same design. There are 18 adjustments, including motor speed settings, which can vary for different workpieces. However, not all of these adjustments will necessarily be used for any one workpiece.

Considering the horizontal position of the welding table 121 with the face 125 upward as 0°, the table 121 is inclined 90° (as shown in FIG. 1) for some workpieces. For example, impellers that have half of the vane 115 machined onto the hub plate 113 and half of the vane 115 machined onto the side plate 114 require welding down the center of the vane. The table is inclined at other angles when required. For example, where an impeller 14 requires fillet welding between the vane 115 and the hub plate 113 and side plate 114, the table is tilted 45° and 135°.

The height of the positioner table center of rotation is adjustable by the holes 118—118 on the vertical posts 117—117. This may be considered a coarse adjustment of the height relationship between the positioner table 121 and the welding gun 13. The adjustment provided by the gear box 51 on main column 20 is the fine adjustment. Controlled automatic height adjustment during the welding cycle is provided by rotating the gun carriage 50 and moving the mounting plate 82 with the variable-speed motor 89.

The welding gun 13 may also track at an angle to the plane of the face 125 of the positioner table 121 by adjusting the angular relationship of the welding head 12 and welding positioner 11 at the ball 138 and socket 137 between the respective base frames 15 and 116.

The holes 134—134 for adjustment of bracket 135 are the coarse adjustment for aligning the welding gun 13 in the same plane as that in the face 125 of the positioner table 121, whereas the adjustment by rotation of the hand wheel 27 is a fine adjustment for this purpose.

The distance between the welding positioner 11 and the welding head 12 may be coarsely adjusted by bar 139 and sleeve 140. Both the fine adjustment of this distance and the automatically controllable adjustment are accomplished by activation of variable-speed motors 39 and 89.

The result of the adjustable features of the welding positioner 11 and welding head 12 is to provide a relationship between the workpiece 14 and the welding gun 13 so that the point being welded or weld area 112 is maintained in the flat welding position. This produces a weld bead of uniform thickness, penetration, and cross section. Maintaining the point being welded at the flat welding position, and also maintaining the welding gun 13 horizontal, results in a uniform weld for a number of reasons. Among these are such things as constant arc length, consistency of distance relationship between welding tip and workpiece, and the fact that the molten metal has more opportunity to stay in place instead of running off as it would if the bead were laid down along a vertical line. High hardenability alloys, at high degrees of preheat, can be welded with the apparatus, since the operator does not need to be at or near the workpiece 14.

To summarize, the present invention includes the following features:

(A) A method for automatic welding comprising the steps of: establishing an arc between a workpiece 14 and a welding electrode 109; and moving the welding electrode 109 and the workpiece 14 concurrently to maintain a weld area 112 in the flat position. The workpiece 14 and the welding electrode 109 are positioned so that the beginning weld area is tangent to the horizontal. Flux is supplied to the weld area 112 by carrying the flux in a flow of shielding gas. A welding speed is selected commensurate with the material of the workpiece 14, and a consumable wire electrode 109 is fed to the weld area 112 at a rate compatible with the rate of welding speed.

(B) Apparatus for automatic welding along a complex track comprising the combination of: a welding gun 13, a rotatable supporting structure 121 for a workpiece 14, a movable carriage 50 for supporting the welding gun 13, and means for controllably rotating the supporting structure 121, and moving the movable carriage 50 concurrently to maintain the weld area 112 in the flat position. The apparatus may also include a hopper 80 for containing finely divided flux, the hopper 80 having a conduit 105 from the hopper 80 to a pipe 106 communicating with the tip 108 of the welding gun 13 where shielding gas is mixed with the flux and discharged onto the weld area and a feeder 81 for supplying consumable welding wire 109 to the tip 108 of the welding gun 13.

(C) Apparatus for automatic welding along a complex track comprising the combination of: a welding positioner 11 having a base 116, a rotatable table 121 vertically adjustable on the base 116 for receiving and holding a workpiece 14, the table 121 being rotatable clockwise and counterclockwise about an axis perpendicular to the surface 125 of the table 121, and first variable-speed power means 128 for controlling the speed of rotation of the table 121; a welding head 12 having a first frame 15, a second frame 30 slidably supported on the first frame 15 for movement toward and away from the workpiece 14, a third frame 21—23 slidably supported on the second frame 30 for horizontal movement perpendicular to the movement of the second frame 30, a vertical column 20 fixedly mounted on the third frame 21—23, a fourth frame 55 slidably supported on the vertical column 20 for vertical movement, the fourth frame 55 being tiltable clockwise and counterclockwise about a horizontal axis parallel to the direction of movement of the third frame 21—23, a fifth frame 82—83—84 slidably supported on the fourth frame 55 for movement toward and away from the workpiece 114, the fifth frame 82—83—84 being tiltable clockwise and counterclockwise about an axis parallel to the movement of the fifth frame 82—83—84, an elongated welding gun 13 having a consumable wire electrode 109 supported by the fifth frame 82—83—84, second variable-speed power means 39 for moving the second frame 30, third variable-speed power means 89 for moving the fifth frame 82—83—84, first slidably adjustable limits switches 41 and 42 activated by contact with the second frame 30 for regulating the movement of the second frame 30 through a plurality of operative positions, second slidably adjustable limit switches 92 and 95 activated by contact with the fifth frame 82—83—84 for regulating movement of the fifth frame 82—83—84 through a plurality of operating positions, a third slidably adjustable limit switch 93 activated by a first cam 98 on the fifth frame 82—83—84 for stopping movement of the fifth frame 82—83—84 and starting movement of the second frame 30, a fourth slidably adjustable limit switch 94 activated by a second cam 99 on said fifth frame 82—83—84 for controlling the first variable-speed power means 128, the variable-speed power means 39, 89, and 128 and the limit switches 92, 93, 94, and 95 cooperating to controllably rotate the tiltable table 121 and move the welding head 12 concurrently to maintain a weld area 112 in the flat position; horizontal adjustment means 137, 138, 139, and 140 between the welding position 11 and the welding head 12; a hopper 80 mounted on the fifth frame 82—83—84 of the welding head 12 for containing a granulated fusible flux; a conduit 105 from the hopper 80 to a pipe 106 communicating with the tip of the welding gun 13, the flux being picked up and carried by shielding gas flowing in the pipe 106 for discharge onto the weld area; and a feeder 81 mounted on the fifth frame 82—83—84 of the welding head 12 for supplying consumable wire 109 to the tip of the welding gun 13.

The reference characters in the above summary indicate generally the primary components shown in the drawings corresponding to the recited features, to facilitate understanding of the claims. The reference characters are used merely by way of example, however, and not in any limiting sense.

While the form of the invention herein disclosed constitutes a preferred embodiment, it is not intended to describe all of the possible equivalent forms or ramifications of the invention. It will be understood that the words used are words of description rather than of limitation, and that various changes, as in shape, relative size, and arrangement of parts, may be made without departing from the spirit or scope of the invention herein disclosed.

What is claimed is:

1. A method for automatic welding of impellers and the like comprising the steps of: positioning a workpiece and a welding electrode so that the beginning weld area is in the flat position; establishing an arc between said workpiece and said welding electrode; supplying flux to the weld area by carrying said flux in a flow of shielding gas; and concurrently moving said welding electrode in a substantially linear path and said workpiece about a stationary axis to maintain said weld area at said flat position.

2. A method for automatic welding in confined spaces comprising the steps of: positioning a workpiece and a consumable wire electrode so that the beginning weld area is in the flat position; selecting a rate of welding speed commensurate with the material of said workpiece; establishing an arc between said workpiece and said consumable wire electrode; feeding said consumable wire electrode to said weld area at a rate compatible with said rate of welding speed; supplying flux to the weld area by carrying said flux in a flow of shielding gas; and moving said welding electrode and said workpiece concurrently to maintain said weld area at said flat position.

3. Apparatus for automatic welding along a complex track, comprising the combination of: a welding gun; a rotatable supporting structure for a workpiece; a movable carriage for supporting said welding gun; and means for controllably rotating said supporting structure about a stationary axis and moving said movable carriage in a substantially linear path concurrently to maintain said weld area in the flat position.

4. Apparatus for automatic welding in confined spaces along a complex track comprising the combination of: a welding gun; a rotatable supporting structure for receiving and holding a workpiece; a hopper for containing finely divided flux having a conduit from said hopper to a pipe communicating with the tip of said welding gun where shielding gas is mixed with said flux and discharged onto the weld area; a movable carriage for supporting said welding gun; and means for controllably rotating said supporting structure and moving said movable carriage concurrently to maintain said weld area in the flat position.

5. Apparatus for automatic welding in confined spaces comprising the combination of: an elongated welding gun having a welding electrode and an opening adjacent to said electrode for discharging granulated fusible flux and shielding gas to the weld area; a rotatable supporting structure for receiving and holding a workpiece; said supporting structure being tiltable to vary the axis of rotation thereof; a hopper for containing said flux having a conduit from said hopper to a pipe communicating with said opening adjacent to said electrode where said shielding gas is mixed with said flux; a movable carriage for supporting said welding gun; and means for controllably rotating said supporting structure and moving said movable carriage concurrently to maintain said weld area in the flat position.

6. Apparatus for automatic welding along a complex track comprising the combination of: an elongated welding gun having a consumable welding wire electrode and an opening adjacent to said electrode for supplying finely divided flux and shielding gas to the weld area; a vertically adjustable, rotatable table for receiving and holding a workpiece, said table being tiltable to vary the axis of rotation thereof; a hopper for containing said flux having a conduit from said hopper to a pipe communicating with said opening adjacent to said electrode where said shielding gas is mixed with said flux; a wire feeder for supplying said consumable welding wire to the tip of said welding gun; a movable carriage for supporting said welding gun; and means for controllably rotating said supporting structure and moving said movable carriage concurrently to maintain said weld area in the flat position.

7. Apparatus for automatic welding along a complex track comprising the combination of: a welding positioner having a base, a rotatable table vertically adjustable on said base for receiving and holding a workpiece, said table being rotatable clockwise and counter-clockwise about an axis perpendicular to the surface of said table, and first variable-speed power means for controlling the speed of rotation of said table; a welding head having a first frame, a second frame slidably supported on said first frame for movement toward and away from said workpiece, a third frame slidably supported on said second frame for horizontal movement perpendicular to the movement of said second frame, a vertical column fixedly mounted on said third frame, a fourth frame slidably supported on said vertical column for vertical movement, said fourth frame being tiltable clockwise and counterclockwise about a horizontal axis parallel to the direction of movement of said third frame, a fifth frame slidably supported on said fourth frame for movement toward and away from said workpiece, said fifth frame being tiltable clockwise and counterclockwise about an axis parallel to the movement of said fifth frame, an elongated welding gun having a consumable wire electrode supported by said fifth frame, second variable-speed power means for moving said second frame, third variable-speed power means for moving said fifth frame, first slidably adjustable limit switches activated by contact with said second frame for regulating the movement of said second frame through a plurality of operative positions, second slidably adjustable limit switches activated by contact with said fifth frame for regulating movement of said fifth frame through a plurality of operative positions, a third slidably adjustable limit switch activated by a first cam on said fifth frame for stopping movement of said fifth frame and starting movement of said second frame, a fourth slidably adjustable limit switch activated by a second cam on said fifth frame for controlling said first variable-speed power means, said variable-speed power means and said limit switches cooperating to controllably rotate said tiltable table and move said welding head concurrently to maintain a weld area in the flat position; and horizontal adjustment means between said welding positioner and said welding head.

8. Apparatus for automatic welding along a complex track comprising the combination of: a welding positioner having a base, a rotatable table vertically adjustable on said base for receiving and holding a workpiece, said table being rotatable clockwise and counterclockwise about an axis perpendicular to the surface of said table, and first variable-speed power means for controlling the speed of rotation of said table; a welding head having a first frame, a second frame slidably supported on said first frame for movement toward and away from said workpiece, a third frame slidably supported on said second frame for horizontal movement perpendicular to the movement of said second frame, a vertical column fixedly mounted on said third frame, a fourth frame slidably supported on said vertical column for vertical movement, said fourth frame being tiltable clockwise and counterclockwise about a horizontal axis parallel to the direction of movement of said third frame, a fifth frame slidably supported on said fourth frame for movement toward and away from said workpiece, said fifth frame being tiltable clockwise and counterclockwise about an axis parallel to the movement of said fifth frame, an elongated welding gun having a consumable wire electrode supported by said fifth frame, second variable-speed power means for moving said second frame, third variable-speed power means for moving said fifth frame, first slidably adjustable limit switches activated by contact with said second frame for regulating the movement of said second frame through a plurality of operative positions, second slidably adjustable limit switches activated by contact with said fifth frame for regulating movement of said fifth frame through a plurality of operative positions, a third slidably adjustable limit switch activated by a first cam on said fifth frame for stopping movement of said fifth frame and starting movement of said second frame, a fourth slidably adjustable limit switch activated by a second cam on said fifth frame for controlling said first variable-speed power means, said variable-speed power means and said limit switches cooperating to controllably rotate said tiltable table and move said welding head concurrently to maintain a weld area in the flat position; horizontal adjustment means between said welding positioner and said welding head; a hopper mounted on said fifth frame of said welding head for containing a granulated fusible flux; a conduit from said hopper to a pipe communicating with the tip of said welding gun, said flux being picked up and carried by shielding gas flowing in said pipe for discharge onto said weld area; and a feeder mounted on said fifth frame of said welding gun for supplying consumable wire to the tip of said welding gun.

References Cited in the file of this patent
UNITED STATES PATENTS

| | | |
|---|---|---|
| 1,589,017 | Lincoln | June 15, 1926 |
| 1,975,578 | Kenney | Oct. 2, 1934 |
| 2,259,976 | Howard | Oct. 21, 1941 |
| 2,907,866 | Yenni | Oct. 6, 1959 |
| 2,974,218 | Willis et al. | Mar. 7, 1961 |